United States Patent
Stich et al.

[11] Patent Number: 5,826,832
[45] Date of Patent: Oct. 27, 1998

[54] DEVICE FOR UNFOLDING TWO PANELS FOR SOLAR GENERATORS

[75] Inventors: Walter Stich, Miesbach; Axel Stöckle, Immenstaad, both of Germany

[73] Assignee: Daimler-Benz Aerospace AG, Germany

[21] Appl. No.: 819,722

[22] Filed: Mar. 17, 1997

[30] Foreign Application Priority Data

Mar. 15, 1996 [DE] Germany ............... 196 10 297.9

[51] Int. Cl.$^6$ .................................................... B64G 1/44
[52] U.S. Cl. ........................................................ 244/173
[58] Field of Search ............................ 244/158 R, 173; 136/245, 292; 160/213, 229.1; 52/173.3, 1, 71

[56] References Cited

U.S. PATENT DOCUMENTS

| | | | |
|---|---|---|---|
| 3,733,785 | 5/1973 | Maier et al. | 244/173 |
| 4,880,188 | 11/1989 | Roth et al. | 244/173 |
| 5,037,043 | 8/1991 | Roth et al. | 244/173 |
| 5,356,095 | 10/1994 | Aker | 244/173 |
| 5,509,747 | 4/1996 | Kiendl | 244/173 |
| 5,673,459 | 10/1997 | Baghdasarian | 244/173 |

*Primary Examiner*—Galen L. Barefoot
*Attorney, Agent, or Firm*—Evenson, McKeown, Edwards & Lenahan, P.L.L.C.

[57] ABSTRACT

The invention provides a device for unfolding solar panels 2, 3 for a spacecraft, which solar panels are connected with one another by an articulated axle 4, which in turn is connected with actuating devices for unfolding the panels by way of a tension device gearing provided with cable pulleys 11. An uncoupling mechanism, operative after unfolding of one panel 3, permits the articulated axle 4 to be separated from the tension device gearing. Upon swivelling of the unfolded panel 3 into an unfolded position, a pin 8, which is arranged in parallel to the articulated axle 4 engages in circumferentially extending grooves 12 and 12*a*. In this manner, the swivelled panel 3 can be guided to follow the solar altitude.

6 Claims, 3 Drawing Sheets

DEVICE FOR UNFOLDING TWO PANELS FOR SOLAR GENERATORS

This application claims the priority of German patent document 196 10 297.9, the disclosure of which is expressly incorporated by reference herein.

BACKGROUND AND SUMMARY OF THE INVENTION

The invention relates to a device for unfolding two articulated panels for a solar generator.

After the panels are unfolded, known solar generators form a rigid surface. For example, German Patent Document DE-PS 2 021 580 discloses an arrangement in which the panel is unfolded by means of a tension device gearing, after which the hinges lock, thus precluding additional swivel movement. Such a hinge is disclosed, for example, in German Patent Document DE 32 15 431 C2. However, it is very desirable for the panel, or at least a portion of the panel, to be guidable for following the solar elevation in certain positions.

It is an object of the present invention to provide a device for unfolding panels which makes it possible, after the panel is completely unfolded, to rotate and guide a portion of the overall surfaces of the panel to follow the sun elevation (in the case of a solar generator).

This object is achieved by the device for unfolding two panels according to the invention, which includes a mechanism that uncouples the articulated axle from the tension device gearing after the panel is unfolded. In this manner it is possible to swivel the panel connected directly with the articulated axle and the other panel connected by way of the tension device gearing, relative to each other. Thus, in the case of a solar generator, either all or a portion of the panels can be guided continuously to follow the solar elevation. After uncoupling the panel connected with the device, it is swivelled by means of a servo motor arranged on the axis of rotation, by pulses transmitted to the servo motor.

Other objects, advantages and novel features of the present invention will become apparent from the following detailed description of the invention when considered in conjunction with the accompanying drawings.

DETAILED DESCRIPTION OF THE DRAWINGS

Figure 1:
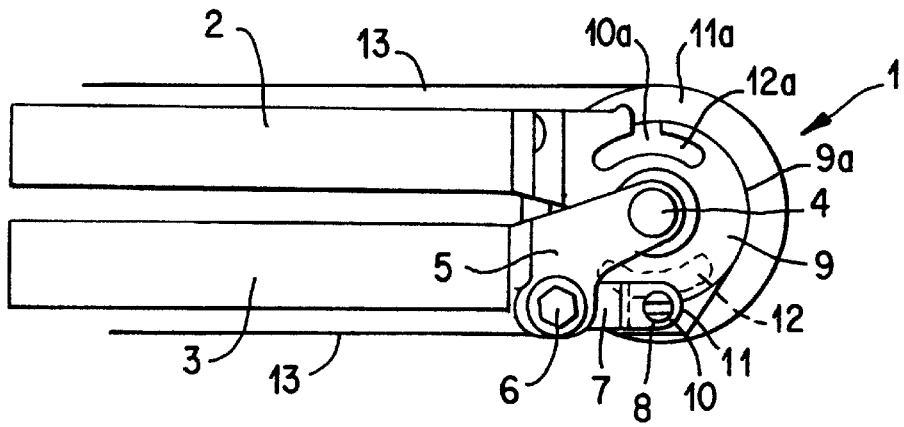
FIG. 1 is a view of the device according to the invention for unfolding two panels of a solar generator, which are shown in the folded condition.

FIG. 1 illustrates a device 1 for unfolding two panels 2 and 3, with the device arranged in its folded position. The device 1 and the panels 2 and 3 are parts of a solar generator for satellites. A bearing flange 5, which is rigidly connected with panel 3, can swivel about a central articulated axle 4. The bearing flange 5 also has a bearing axle 6 on which there is articulated a steering knuckle 7, which has a pin 8 displaceably disposed at its end, in parallel to the articulated axle 4.

A cam plate 9 with a cam surface 9a is connected to the panel 2. The pin 8 engages in a slot 10 of a disk 11 (shown only in outline in FIG. 1), that is connected with a cable pulley 11a. The slot 10 opens into a groove 12. At the upper end of the cam plate 9, a radially more shallow slot 10a is provided which opens into a similar groove 12a. A cable 13, which as part of a tension device gearing is led to other pulleys of the solar generator, is placed on pulley 11a.

Figure 2:
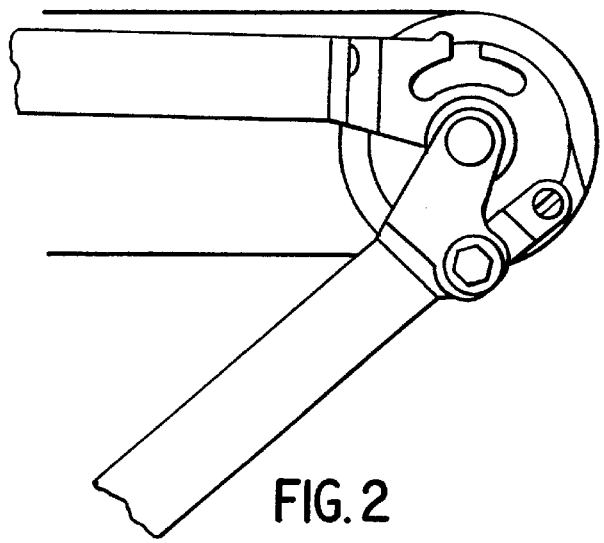
FIG. 2 is a view of the device according to FIG. 1 with partially unfolded panels.

FIG. 2 shows panel 2 in a semi-unfolded condition, in which the pin 8 is guided along the cam surface 9a. Since in the folded and partially folded states, the pin 8 is held in the slot 10 of the disk 11 by the cam surface 9a, when the disk 11 is rotated by the cable 13, the panel 3 is caused to rotate with it.

Figure 3:
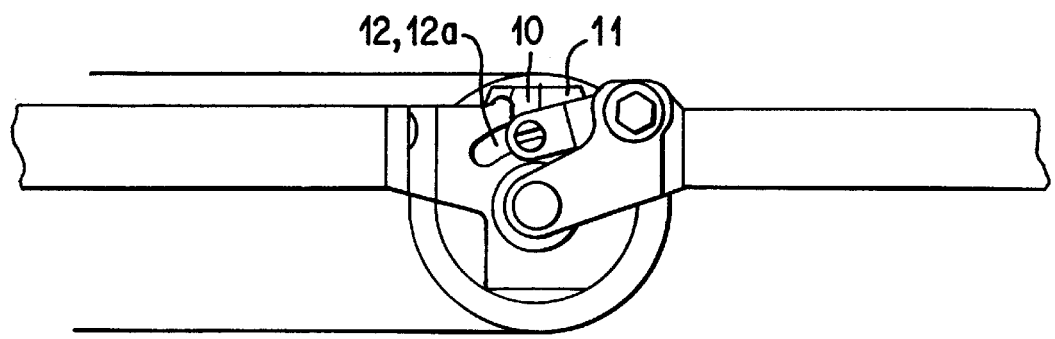
FIG. 3 is a view of the device according to FIG. 1 with fully unfolded panels.

FIG. 3 illustrates panel 3 in a fully unfolded condition, in which the pin 8 is moved by way of the slots 10 and 10a into the grooves 12 and 12a, so that within limits set by the extremities of these grooves, it is uncoupled from the tension device gearing.

Figure 4:
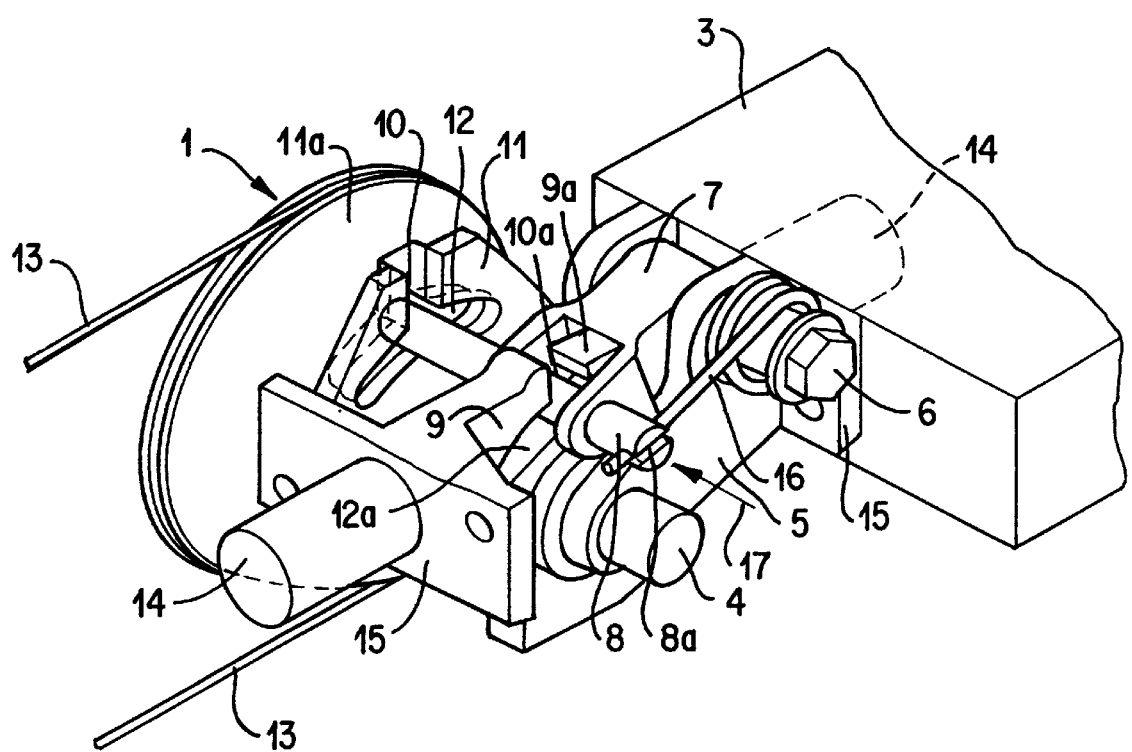
FIG. 4 is a perspective view of the device with the panels fully unfolded as in FIG. 3.

Additional details of the device 1 are illustrated in the perspective representation according to FIG. 4. (To better show the details of the mechanism, the panel 2 is not shown.) The device 1 is fastened to the panels 2, 3 by means of gluing to bearing pins 14, and the panels 2 and 3 are also screwed to cross members 15 which carry the bearing pins 14. A spring 16 is disposed on the bearing axle 6, and has an end which engages in a slot 8a of the pin 8, and biases the latter in the direction of an arrow 17. During the unfolding of panel 3, the spring 16 therefore presses the pin 8 against the cam surface 9a of cam plate 9, and in the end (unfolded) position (by way of the slots 10 and 10a) into the grooves 12 and 12a.

Figure 5:
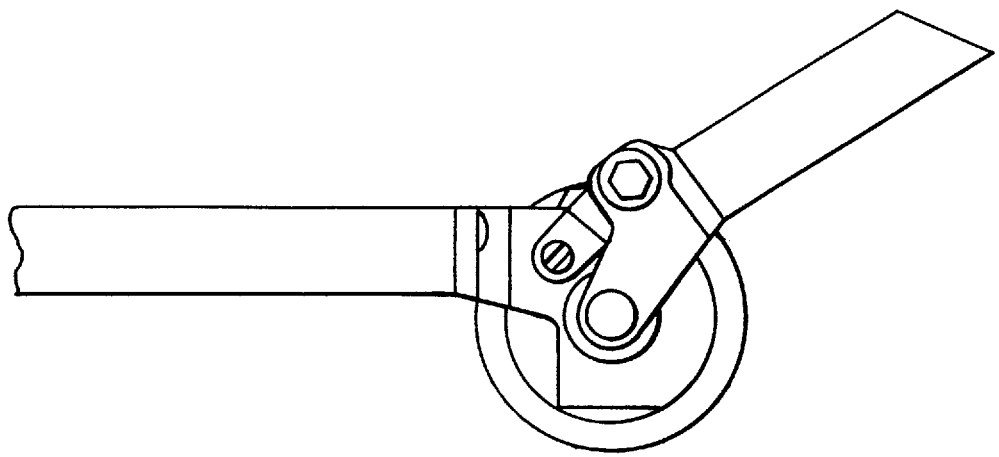
FIGS. 5 and 6 are views of the device in which the right-hand panel is maneuvered in two different positions to follow the solar elevation.
Figure 6:
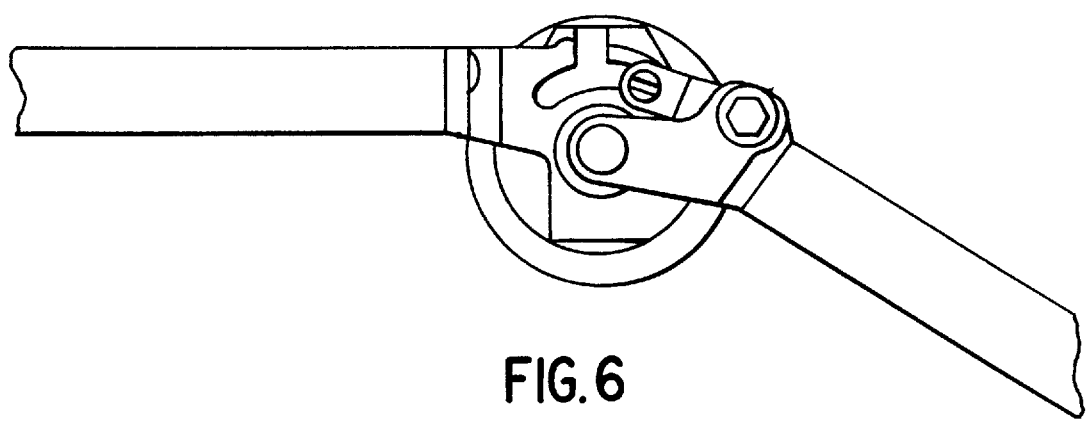

When the pin 8 is situated in the grooves 12 and 12a, the device 1 is uncoupled from the tension device gearing and it is possible, by rotating the articulated axle 4 (for example, by means of a servo motor) to freely move panel 3 in the grooves 12 and 12a in order to guide panel 3 and other panels also connected by the tension device gearing to follow the solar elevation. FIGS. 5 and 6 show the possible end positions of the stops of panel 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for unfolding satellite solar panels which are connected with one another by an articulated axle which in turn is connected with actuating devices for unfolding the panels by way of a tension device gearing provided with cable pulleys, wherein said apparatus includes an uncoupling mechanism, operative after unfolding of one panel 3 by swivelling it about the articulated axle 4, for uncoupling the articulated axle 4 from the tension device gearing, whereby the unfoldable panel 3 and other panels connected by way of the tension device gearing can be swivelled relative to each other.

2. Device according to claim 1, further comprising:
   a bearing axle 6 connected by means of a bearing flange 5 with the articulated axle 4;
   a steering knuckle 7 articulated on the bearing axle 6; and
   a pin 8 inserted on the end of the steering knuckle 7, and arranged in parallel to the articulated axle 4; wherein during swivelling of the panel 3 about the articulated axle 4, an end of the pin 8 facing the cable pulley 11 is pressed by a spring 16 onto a cam edge 9a of a cam plate 9 connected with the cable pulley 11;

after the panel 3 is unfolded, the pin 8 is pressed by the spring 16 into grooves 12, 12a situated in the cam plate 9 and in the cable pulley 11; and by the rotating of the articulated axle 4, the unfolded panel 3 can be swivelled with respect to the other panel 2 about an angle which corresponds to the length of the groove 12.

3. Device according to claim 2 wherein the articulated axle 4 is rotated by a servo motor in response to a pulse.

4. Coupling apparatus for rotatably coupling solar panels for a spacecraft comprising:

an axle 4 on which said solar panels are articulated, whereby said solar panels can be rotated relative to one another about said axle;

a cam plate 9 fixedly coupled to one of said solar panels and having a camming surface which extends circumferentially about said axle and terminates in a first radial extending slot which opens into a first circumferentially extending slot in said cam plate;

steering knuckle rotatably coupled to another of said solar panels and having a camming pin which is disposed parallel to said axle and is spring biased to bear against said camming surface, said first radially extending slot in said camming plate being situated so that said camming pin drops through said first radially extending slot into said first circumferentially extending slot when said solar panels reach an unfolded position, whereby relative rotation of said panels in said unfolded position is limited.

5. Coupling apparatus according to claim 4 further comprising:

a cable pulley rotatably disposed on said axle and actuatably coupled by a pulley cable for causing said pulley to rotate, said pulley having a second radially extending slot which opens into a second circumferentially extending slot, and which engages with an end of said camming pin when said camming pin bears against said camming surface.

6. A cable pulley for actuating a rotation of a coupling device for rotatably coupling solar panels for a spacecraft, said coupling device having an axle on which said solar panels are articulated and a camming pin which is disposed parallel to said axle, is coupled to one of said solar panels and bears against a circumferentially extending camming surface fixed to another of said solar panels, said pulley comprising:

a peripheral surface for engaging a pulley cable for causing said pulley to rotate;

a radially extending slot for engagement with said camming pin and causing said one of said solar panels to rotate with said pulley; and a circumferentially extending slot into which said camming pin moves when said solar panels reach an unfolded position; whereby further rotation of said solar panels in said unfolded position is limited by extremities of said circumferentially extending slot.

\* \* \* \* \*